United States Patent [19]

Baumgartner et al.

[11] 4,382,044
[45] May 3, 1983

[54] WATER PURIFICATION SYSTEM EMPLOYING OZONE INJECTION

[75] Inventors: Walter P. Baumgartner, Los Angeles; Bruce O. Yancey, Tjunga, both of Calif.

[73] Assignee: Carroll Shelby, Gardena, Calif.; a part interest

[21] Appl. No.: 275,259

[22] Filed: Jun. 19, 1981

Related U.S. Application Data

[63] Continuation of Ser. No. 141,467, Apr. 18, 1980, abandoned, which is a continuation of Ser. No. 17,478, Mar. 5, 1979, abandoned.

[51] Int. Cl.³ .............................................. B01F 3/04
[52] U.S. Cl. ............................ 261/76; 261/DIG. 42; 261/DIG. 75; 210/192; 239/419.5; 239/428.5
[58] Field of Search ................ 261/76, 77, DIG. 75, 261/DIG. 42; 210/192, 760; 239/419.5, 425.5, 239/426, 428.5

[56] References Cited

U.S. PATENT DOCUMENTS

| | | | |
|---|---|---|---|
| 718,683 | 1/1903 | Wiedenmayer | 261/76 |
| 1,803,628 | 5/1931 | Lathrop | 261/76 |
| 2,364,199 | 12/1944 | Derr | 261/76 |
| 2,564,060 | 8/1951 | Gettins | 239/428.5 |
| 2,941,729 | 6/1960 | Goodrie | 239/428.5 |
| 3,421,999 | 1/1969 | Corwin | 210/192 |
| 3,680,791 | 8/1972 | Morton | 239/428.5 |
| 3,856,671 | 12/1974 | Lee et al. | 210/192 |
| 3,918,647 | 11/1975 | Lamz et al. | 239/428.5 |
| 3,997,631 | 2/1976 | Matsuoka et al. | 261/76 |
| 4,105,721 | 8/1978 | Schliebe | 261/76 |

FOREIGN PATENT DOCUMENTS

| | | | |
|---|---|---|---|
| 526347 | 10/1921 | France | 261/76 |
| 109281 | 9/1917 | United Kingdom | 261/76 |
| 216233 | 5/1924 | United Kingdom | 261/76 |

Primary Examiner—Tim R. Miles
Attorney, Agent, or Firm—Edward A. Sokolski

[57] ABSTRACT

An ozone generator is formed by a plurality of concentric tubular plate members forming positive and negative electrodes which are interleaved with each other. A high voltage discharge is applied from a transformer between the electrodes to cause an electric discharge in the air contained therebetween, thereby generating a supply of ozone. The air is fed to a suction nozzle device through which a water stream to be purified passes. The suction nozzle is constructed so that the water stream is markedly speeded up so as to generate a partial vacuum in an air pocket formed between the water stream and the inner walls of the nozzle. The ozone, which is fed to the nozzle in the region where this air pocket is formed, is thus sucked into the nozzle and efficiently injected into the water stream, thereby effecting the purifying action.

7 Claims, 5 Drawing Figures

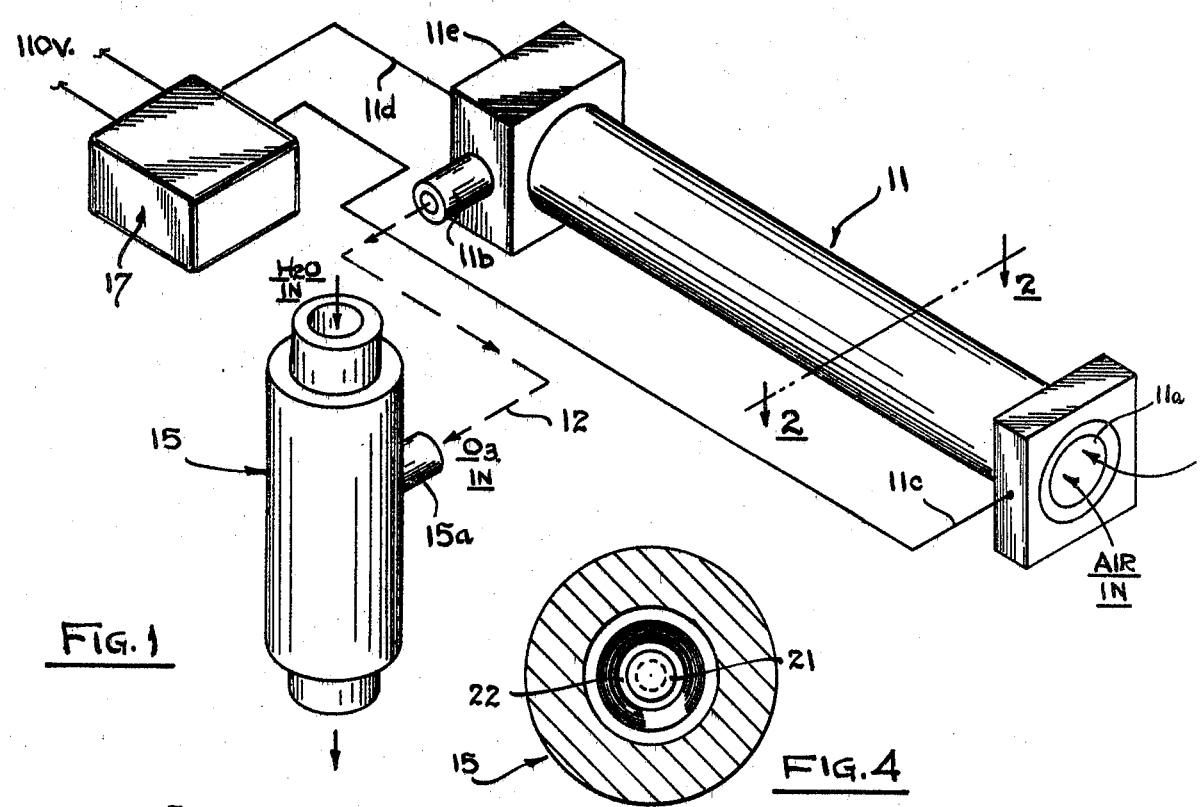
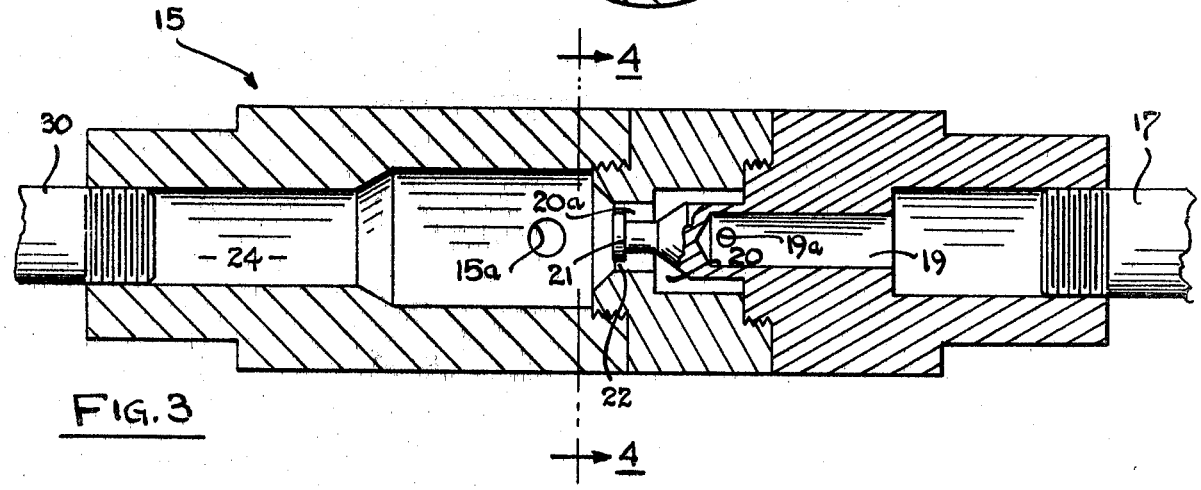
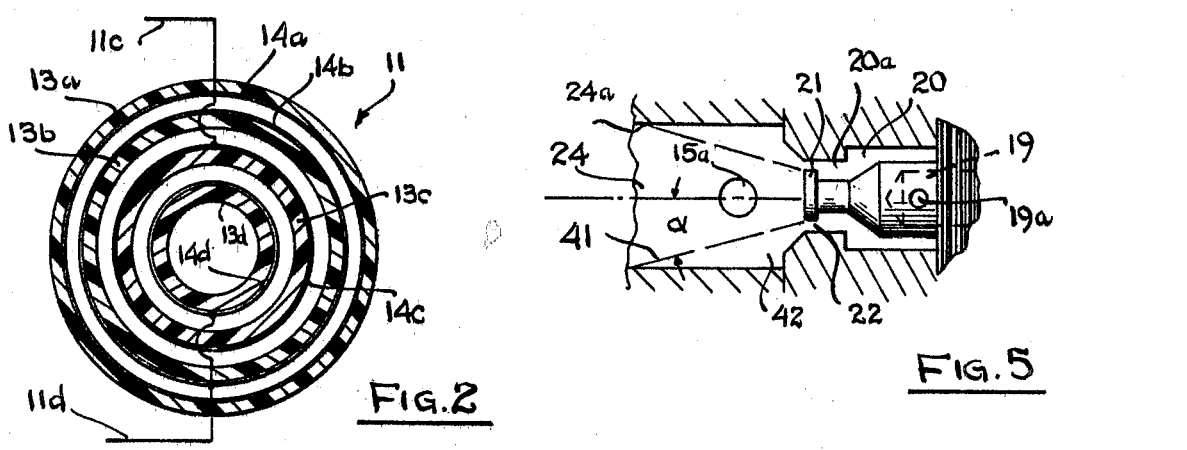

WATER PURIFICATION SYSTEM EMPLOYING OZONE INJECTION

This application is a continuation of application Ser. No. 141,467, filed Apr. 18, 1980, (now abandoned) which is in turn a continuation of Application Ser. No. 17,478, filed Mar. 5, 1979 (now abandoned).

This invention relates to the purification of water and more particularly to a system for generating ozone and injecting such ozone into a water stream.

The use of ozone for the disinfection of water has been used at least since the early 1900's and is now being used in many installations in Canada and in Europe. The use of ozone for purification of water has not as yet come into widespread use in the United States, such as the general acceptance and widespread use of chlorine, which is readily available and can be easily and economically employed. In recent years, interest has increased in the use of ozone in view of its powerful oxidizing properties and almost instantaneous action and the absence of the formation of a permanent residual material. Further, in swimming pool purification systems, the nuisance of periodically having to add chlorine to the water and the generally unpleasant effects of chlorine on the eyes and nose make an ozone purification system particularly interesting. Prior art ozone purification systems are thoroughly discussed in Chapter VIII (by W. E. J. Diaper) of *Ozone in Water and Waste Water Treatment*, edited by Francis L. Evans, Environmental Protection Agency, published in 1972 by Ann Arbor Science Publications, Ann Arbor, Michigan.

One of the problems encountered in prior art ozone purification systems is the need for having a pumping system for effectively injecting the ozone into a rapidly moving water stream which is passing into the swimming pool or other water utilization device. If, of course, there is a failure in such a pumping system, the water purification ceases with the resultant undesirable, often dangerous results. This means that a highly reliable and often expensive pumping system must be employed along with some sort of backup system and/or warning device should the pumping device fail, all of which adds to the cost of the installation.

The system of the present invention overcomes the aforementioned shortcomings of prior art ozone water purification systems in providing a simple, economical, yet highly effective device for injecting or imploding ozone into a water stream without the use of a pumping system. This desired end result is achieved in the device of the present invention without the use of any moving parts or added equipment, but rather by self-generating a suction by means of the water stream as it passes through a unique injector nozzle device. This nozzle device is formed with a deflector that deflects the water stream outwardly against an inner wall formed in the nozzle at an angle such that an air pocket is formed between the water stream and a portion of the inner wall of the nozzle. The motion of the water stream creates a partial vacuum in this air pocket such that ozone fed to the nozzle in the area of this pocket is efficiently sucked into the nozzle and injected or imploded into the water stream. The ozone is generated by means of a generator device formed from a plurality of concentrically arranged electrodes between which air is passed. A high voltage alternating voltage is applied between opposing pairs of electrodes so as to create an electric discharge between opposite electrodes, thereby converting the air to ozone which is drawn into the suction nozzle.

It is therefore an object of this invention to provide a highly economical and reliable water purification system employing ozone.

It is a further object of this invention to provide an improved water purification system employing ozone wherein the ozone is injected into the water stream by virtue of suction created by the water stream itself without the need for moving parts or an external suction generator.

Other objects of the invention will become apparent as the description proceeds in connection with the accompanying drawings of which:

FIG. 1 is a perspective view illustrating a preferred embodiment of the invention;

FIG. 2 is a cross-sectional view taken alone the plane indicated by 2—2 in FIG. 1;

FIG. 3 is a cross-sectional view taken along the plane indicated by 3—3 in FIG. 1;

FIG. 4 is a cross-sectional view illustrating the ozone generator of the preferred embodiment; and FIG. 5 is a schematic view illustrating the formation of the suction pocket in the preferred embodiment of the invention.

Referring now to FIGS. 1-4, a preferred embodiment of the invention is illustrated. Ozone generator 11 is formed from a plurality of cylindrical, concentric plastic tubes 13a–13d which may be of acrylic plastic. The inner walls of tubes 13a–13d are covered with conductive foils 14a–14d respectively, as for example, of aluminum or copper. One end, 11a, of the ozone generator is left open to permit the free access of air to the spaces between the walls of the tubes, the opposite end 11e of the generator being sealed off. An outlet tube, 11b, is provided near the opposite end of the ozone generator for feeding ozone to the injector nozzle 15.

A high voltage transformer 17, which may be connected to a 110 volt AC power line generates a voltage of the order of 10,000 volts. This voltage is fed between electrical connectors 11c and 11d of the ozone generator. Connector 11d is connected to alternate electrodes 14b and 14d while connector 11c is connected to alternate electrodes 14a and 14c. Thus, a high AC voltage is fed between electrodes 14a and 14b, electrodes 14b and 14c, and electrodes 14c and 14d. The high voltage applied between the electrodes causes an electric discharge in the spaces therebetween, thereby converting the air fed to these spaces to ozone. This ozone is sucked out from the ozone generator into injector nozzle 15, as now to be explained.

Injector nozzle 15 has an inlet pipe 17 through which the water stream to be injected with ozone is fed. The nozzle is generally tubular in shape and includes a relatively narrow chamber 19 which is connected through a ring of apertures 19a formed in the chamber walls to a chamber 20 which is externally concentric therewith. Chamber 20 has a narrowed neck portion 20a at the end of which is a disc-shaped deflector member 21, there being a narrow ring-shaped exit slit 22 formed between neck portion 20a and deflector 21 which connects chamber 20 to chamber 24. The water stream thus is deflected outwardly in the general form of a cone from chamber 20 to substantially wider cylindrical chamber 24 which is concentric with chamber 20. As already mentioned, tube 11b feeds ozone from ozone generator 11 to chamber 24 of the nozzle, this tube being connected to inlet tube 15a by means of a suitable gas line 12 (indicated schematically). The water is exited from chamber 24 through outlet pipe 30.

Referring now additionally to FIG. 5, the nozzle operates in the following manner to develop suction to tube 11b so as to draw ozone to the nozzle and inject or implode it into the water stream. By virtue of the positioning and dimensions of deflector 21, water stream 40 is deflected outwardly in a conical form, an air pocket 42 being formed between the stream and the wall of chamber 24. The velocity of the water stream increases substantially at narrow slit 22, and the increased velocity water stream causes the adjacent air pocket 42 also to move at an increased velocity. By virtue of the high velocity air pocket, in accordance with Bernoulli's principle, strong suction is developed in inlet pipe 15a which draws the ozone from the ozone generator and effectively injects or implodes it into the water stream.

It has been found in an operative embodiment of the invention wherein chamber 24 has a longitudinal dimension of 1½" and a diameter of 1" that optimum results can be achieved with a conical water stream 41 having a cone angle "a", as shown in FIG. 5, which is 15°–30° (the cone angle being defined as the angle between the wall of the cone and a line parallel to its longitudinal centerline). In this operative embodiment, the water stream first strikes the inner wall of chamber 24 at a point 24a therealong between the midpoint of the chamber and the water entry end thereof. The ozone injected water stream is fed from chamber 24 to outlet pipe 30 from where it runs to a swimming pool or other utilization device. It thus can be seen that the ozone is efficiently injected into the water stream without the need for any special pumping system; but rather by a unique suction technique incorporated in the design of the nozzle.

While the invention has been described and illustrated in detail, it is clearly to be understood that this is intended by way of illustration and example only and is not to be taken by way of limitation, the spirit and scope of this invention being limited only by the terms of the following claims.

We claim:

1. A system for generating ozone and injecting it into a water stream comprising:
   (a) an ozone generator including
      (1) a plurality of oppositely positioned electrodes (14a–14d),
      (2) means (13a–13d) for supporting said electrodes in spaced apart relationship with an air space being formed therebetween and air inlet means (11a) at one end of said electrodes and air outlet means (11b) at the other end thereof,
      (3) means (17) for generating a high voltage potential, and
      (4) means (11c, 11d) for feeding said potential between the oppositely positioned electrodes so as to cause an electric discharge and thereby generating ozone in said air space, and
   (b) an injector nozzle device (15) including
      (1) first chamber means (20) into which the water stream is fed at one end thereof, said chamber means having a wider portion and a narrowed neck portion (20a) formed at the other end thereof,
      (2) deflector means (21) mounted in said narrowed neck portion for deflecting the water stream outwardly in the form of a cone which expands at an increased velocity in the direction of water flow, a slit (22) being formed between the outer edge of the deflector means and the outer end of the inner wall of the neck portion,
      (3) second chamber means (24) connected at one end thereof to said first chamber means by said slit for forming an air pocket between a portion of the walls thereof and said cone, said second chamber means being substantially wider than said first chamber means, the water stream striking the walls of said second chamber means at a predetermined position therealong, and
      (4) means for feeding ozone from said ozone generator to a portion of said second chamber means downstream of the deflector means proximate to said slit and directly into said air pocket,
   a suction being developed in said air pocket which draws the ozone into said second chamber and injects it into the water stream.

2. The system of claim 1 wherein said injector nozzle device (15) further comprises a narrower cylindrical chamber (19) into which the water stream is initially fed, the wider portion of said first chamber means (20) being connected to said narrower chamber by a ring of apertures formed in an end wall portion of said narrower chamber which is internally concentric with the wider portion of said first chamber means.

3. The system of claims 1 or 2 wherein the deflector member is disc-shaped, said slit being ring-shaped.

4. The system of claim 3 wherein the second chamber means is dimensioned and the deflector dimensioned and positioned in said first chamber means to form a water cone having an angle between the wall and the centerline thereof of 15°–30°.

5. The system of claim 1 wherein the ozone generator electrode supporting means comprises at least two pairs of concentric non-conductive tubes, said electrodes being formed by conductive material placed on one of the walls of each of said tubes.

6. The system of claim 5 wherein said inlet means is formed by one of the ends of said tubes being left open, the other ends of said tubes being sealed, said outlet means being formed by a tube connected to said air space near said other of the ends of said tubes.

7. The system of claim 5 wherein the means for generating a high voltage potential comprises an AC power source and a high voltage transformer connected to said source.

* * * * *